United States Patent [19]

Humphry et al.

[11] Patent Number: 5,786,008
[45] Date of Patent: *Jul. 28, 1998

[54] COATED FEED AGGLOMERATES AND METHODS OF MAKING THE SAME

[75] Inventors: R. Kim Humphry; Basil D. Bevans. both of Quincy, Ill.

[73] Assignee: Moorman Manufacturing Company, Quincy, Ill.

[*] Notice: The term of this patent shall not extend beyond the expiration date of Pat. No. 5,650,184.

[21] Appl. No.: 803,956

[22] Filed: Feb. 25, 1997

[51] Int. Cl.⁶ .................................................. A23K 1/00
[52] U.S. Cl. ........................ 426/89; 426/103; 426/285; 426/293; 426/573; 426/576; 426/623; 426/630; 426/801
[58] Field of Search .................. 426/89, 293, 285, 426/623, 630, 103, 573, 576, 807

[56] References Cited

U.S. PATENT DOCUMENTS

| | | |
|---|---|---|
| 2,152,438 | 3/1939 | McHan . |
| 3,139,342 | 6/1964 | Linskey . |
| 3,450,540 | 6/1969 | Graham et al. . |
| 4,034,126 | 7/1977 | Funakoshi et al. . |
| 4,089,984 | 5/1978 | Gilbertson . |
| 4,692,342 | 9/1987 | Gannis et al. . |
| 5,149,562 | 9/1992 | Herbert et al. . |
| 5,650,184 | 7/1997 | Humphry et al. ............ 426/89 |

*Primary Examiner*—Helen Pratt
*Attorney, Agent, or Firm*—Lockwood, Alex, FitzGibbon & Cummings

[57] ABSTRACT

Coated animal feed agglomerates such as pellets are made starting with uncoated agglomerates or pellets that may be formed of easily agglomerated or pelleted ingredients but which may be lacking in desirable nutritional or other ingredients. A binder such as a viscous aqueous gel is coated onto the uncoated agglomerates or pellets. Thereafter, the damp binder coated agglomerates or pellets are dusted with a powder containing ingredients having a substantial lactose content which usually are not amenable to being extruded. After the dusting powder has been applied, the coated and dusted pellets undergo a curing step before they are dried and cooled.

18 Claims, 1 Drawing Sheet

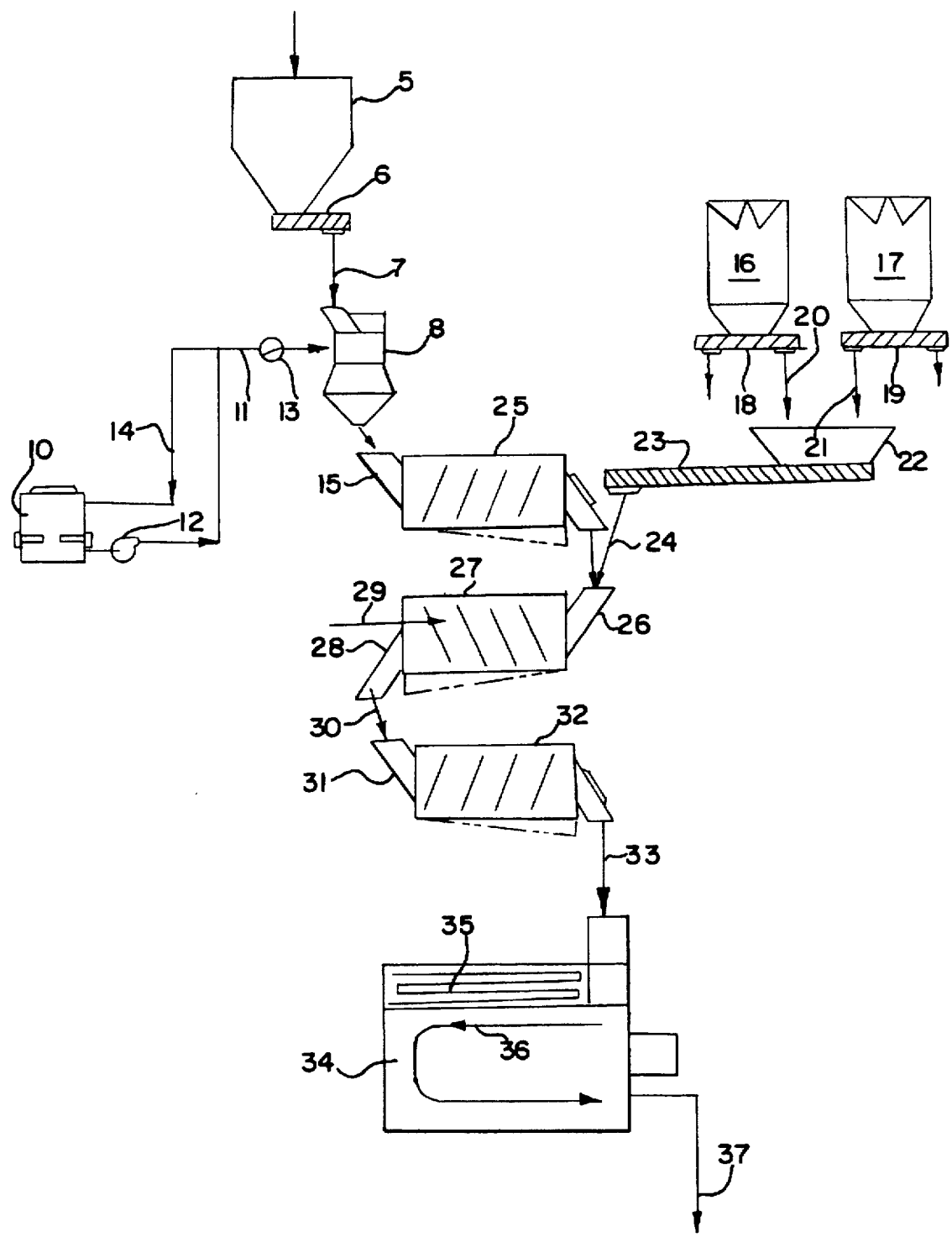

5,786,008

COATED FEED AGGLOMERATES AND METHODS OF MAKING THE SAME

SPECIFICATION

SUMMARY OF THE INVENTION

This invention relates broadly to feed agglomerates coated with powders containing lactose and to methods of making the same. It relates more particularly to such coated agglomerates in the form of animal feed pellets for the livestock industry. As used herein the term "agglomerates" is intended to mean and include one or more feed ingredients in the form of pellets, granules, chunks, nuggets, lumps, briquettes, crumbles or other shapes and forms. Presently, an important embodiment of the invention relates to animal feed pellets, coated with powders containing lactose, comprising cylindrical agglomerations of various lengths resulting from the extrusion of feed mash through a pellet mill die and to the methods of applying the coating thereon.

It is well known that feed agglomerates such as animal feed pellets are formulated so as to comprise a plurality of ingredients incorporated in various proportions depending on their particular nutritional, flavor enhancing, agglomerating, extrusion ability and/or other desired values and properties. Heretofore, in the production of feed agglomerates there have been limitations on either the inclusion, or the level of inclusion of certain desirable or required ingredients such as those which are heat-labile and/or difficult to pelletize or otherwise form into agglomerates in production. For example, pelletized rations containing appreciable quantities of milk derived ingredients such as whey protein concentrate and whey permeate have unacceptable upper limits on their inclusion rates or concentrations since they are heat-labile and unable to withstand the frictional heat generated during extrusion through a pellet die at a normal production speed. Accordingly, when heat-labile ingredients have been present, extrusion and pelleting rates have been inherently slow and unacceptable. Previous efforts to overcome these limitations have generally been concentrated on adding lubricants to achieve better extrusion rates or the use of thinner relief dies so as to reduce frictional heat. However, pellet durabilities have suffered when lubricants and/or thinner dies have been used.

In accordance with the invention disclosed in U.S. Pat. No. 5,650,184 it was found that heat-labile ingredients and, in particular, milk derived lactose-containing ingredients such as whey protein concentrate and whey permeate may be incorporated on feed agglomerates, particularly animal feed pellets at desired inclusion rates by using certain novel coating procedures. Prior to U.S. Pat. No. 5,650,184, coatings were applied to various rations in the form of pellets or other shaped agglomerates, primarily in order to improve their palatability, the object being to place highly palatable ingredients or additives where they are readily tasted. For example, one method used in the pet food industry is to spray pet foods with fat and then dust on low levels of palatability enhancers. Another prior method was to use a concentrated aqueous solution of a coating material and then dry to the desired moisture level. However, these prior procedures and expedients have not been adequately useful in producing feed agglomerates such as animal feed pellets which contain all the desired nutritional or other ingredients in their desired or optimum rates of inclusion.

While the agglomerate or pellet coating procedures disclosed in U.S. Pat. No. 5,650,184 have been found to be successful in practice, it was discovered that on occasion, when the coating material applied to the base agglomerates or pellets contained milk derived lactose-containing ingredients such as whey protein concentrate and whey permeate, the generally free-flowing product discharged from the final drying step could not be immediately packaged since it would cake up and not remain free flowing. In accordance with the present invention, an improvement in the nature of a so-called "cure" was discovered, which upon incorporation in the method disclosed in U.S. Pat. No. 5,650,184 overcame the problem of caking of the usually free-flowing dried product.

According to the present invention, the caking of the normally free-flowing dried end product previously encountered has been eliminated by introducing a so-called "curing" step in the process of U.S. Pat. No. 5,650,184 after the base pellets have been coated with a viscous gel binder and prior to the drying step. In the curing step, after the base pellets have been coated with the viscous gel binder and the coating in powder form containing a lactose ingredient has been dusted or otherwise applied to the pellets, the coated base pellets are agitated for sufficient time for a non-hygroscopic product to form. It is believed that during this retention or curing time that the lactose content changes from its amorphous form to the crystalline form, which is nonhygroscopic, and shelf stable.

Accordingly, the object of the invention, generally stated, is the improvement of the procedure or method disclosed in U.S. Pat. No. 5,650,184 so as to eliminate, for all practical purposes, the problem of caking of the finished, dried product when the coating applied to the base pellets has a substantial lactose content.

A further object of the present invention is to bring about complete dispersion of the viscous gel binder on the basic uncoated agglomerates or pellets by subjecting the gel coated pellets to a tumbling action in an inclined rotating drum.

For a more complete understanding of the nature and scope of the present invention, reference may be had to the following detailed description thereof taken in conjunction with the accompanying drawing.

DESCRIPTION OF THE DRAWING

The accompanying drawing is a flow sheet or diagram of a presently preferred process and equipment by which the present invention has been satisfactorily practiced to make coated feed aggregates, specifically coated animal feed pellets wherein the coating has a substantial lactose content.

Referring to the drawing, the equipment shown therein comprises a bin or hopper 5 in which a supply of uncoated animal feed pellets is maintained. The uncoated pellets may be formulated so as to contain ingredients which allow the pellets to be readily extruded or otherwise formed. The uncoated pellets may or may not be of good enough quality to be fed as produced. Even if they are nutritionally sound they can be made better by application of a coating containing beneficial ingredients. If not of good enough quality to be fed by themselves as extruded, the uncoated pellets can be upgraded and rendered suitable for feeding by application of a suitable coating comprising whey permeate, whey protein concentrate and starch or other lactose-containing ingredients. In either case the coated pellets or aggregates must be free-flowing and capable of withstanding the usual handling procedures.

The uncoated or base pellets are withdrawn from the bottom of the bin 5 by a transfer device 6 of known type and discharged through chute or line 7 into the top of a coater 8 such as a commercially available rotary disc coater. The device 6 may be a vibratory conveyor or a metering screw. Metering of the pellets is accomplished with a vibratory conveyor by raising or lowering a gate (not shown) between the bin 5 and the vibratory conveyor. As the uncoated pellets are being metered into the coater 8 a liquid binder is also metered into the upper portion of the coater 8 from a supply tank 10 through a line 11 in which a pump 12 and flow meter 13 are located. Flow of the binder to the coater 8 may be discontinued and recirculated through return line 14. The liquid binder may be a viscous, aqueous solution of gelatin. The coater 8 serves to evenly deposit a coating of the binder on the surfaces of the pellets as they pass through in the form of a descending curtain. The surfaces of the coated pellets are damp as they are discharged from the bottom of the coater 8 into the inlet 15 at one end of an inclined rotary drum 25.

The inclusion of the rotary drum 25 in the production plant is optional its purpose being to bring about complete dispersion of the viscous gel binder on the surfaces of the agglomerates or pellets. Other pieces of equipment that provide a tumbling action without creating excessive fines may be used in place of the rotary drum 25. Further, the rotary drum 25 can be omitted altogether if the viscous gel coating applied in the coater 8 is uniformly dispersed over the surfaces of the agglomerates or pellets.

From the rotary drum 25, the inclination of which is adjustable as indicated, the gel coated pellets discharge into the inlet 26 in the upper end of a rotary drum 27 the inclination of which can be adjusted as indicated.

In passage through the rotary drum 27 the damp gel coated surfaces of the pellets receive a coating or dusting of a mixture in powder form comprising ingredients having a substantial lactose content and which do not lend themselves to being either incorporated, or being incorporated in the desired concentrations, in the mass from which the uncoated aggregates are formed or extruded in the case of the uncoated pellets. By way of example, the coating powder may contain a mixture of whey permeate, whey protein concentrate, enzymes, microbials, starch, flour and/or blood plasma and flavor enhancer. The dry ingredients of the dry coating powder mixture are stored in the dry ingredient bins 16 and 17. If more than two ingredients are to be included, additional bins will be used. The bottom outlets of the dry ingredient bins 16 and 17 discharge into reversing volumetric screw feeders 18 and 19, respectively. Additional dry ingredient bins will each be equipped with a reversing volumetric screw feeder. Each screw feeder 18, 19 has a discharge outlet into a line or chute 20, 21 which, in turn, discharges the dry ingredient into the feed hopper 22 of a blending conveyor 23. If desired, the ingredients of a dry coating powder mixture may be pre-blended and the blend introduced into the bins 16 and 17. This permits one of the bins 16 and 17 to have a supply available as the other is emptied.

From the blending conveyor 23 the dry coating mixture is discharged into a chute 24 which feeds into the inlet 26 of the rotary drum 27. Preferably, the dry coating mixture in the form of a powder is metered into the rotary drum 27 at such a rate as to at all times maintain a slight excess of the powder therein and thereby prevent coating buildup on the interior surfaces of the drum 27 and of the downstream equipment. As the damp binder coated aggregates or pellets move through the rotary drum 27 to its outlet their surfaces receive a smooth, uniform and continuous adherent surface coating or dusting of the dry powder. Preferably, the rotary drum 27 is downwardly inclined at an adjustable angle so that retention time of the contents may be controlled as required. An improved product may be obtained by metering starch powder into the rotary drum 27 at the point indicated by the arrow 29.

The coated pellets discharge from the rotary drum 27 through the outlet 28 into the line 30 which discharges into the inlet 31 of a rotary drum 32. A vibratory screen may be located in the line 30. In the rotary drum 32 the gel coated and, in turn, powder coated pellets are tumbled for a sufficient period of time for the powder coating to undergo a cure in which it is believed that the lactose content in the liquid whey permeate and whey protein concentrate undergo a transition from the amorphous form to a crystalline structure that yields a nonhygroscopic product.

Manufactured whey powders have various ratios of amorphous, beta and alpha lactose. The whey powders used in the manufacture of the coated pellets should have sufficient amorphous lactose so as to be relatively hygroscopic for optimum bonding and the manufacturing conditions should be such as to bring about a conversion of the amorphous lactose to the alpha form so that the finished product can be handled without caking, clumping or sticking. This conversion is enhanced by providing optimum temperature and moisture for this phase of the process and by providing the equipment necessary to allow this phase time for completion. By doing this, the process of manufacturing the coated feed agglomerates or pellets can be made continuous from the coating step through packaging.

The coated and cured pellets discharge from the rotary drum 32 through line 33 into the inlet of a combination dryer and cooler 34 of known commercial type which is equipped with steam heating coils 35 and a stainless steel web solid tray belt 36. Preferably, the pellets are screened in passing from rotary drum 32 to dryer and cooler 34. In passing through the dryer/cooler 34 the coated pellets are conditioned for discharge therefrom in non-caking finished form through discharge 37 to packaging line 37.

The following example will serve as a description of an illustrative working example of one manner in which the invention may be practiced to make coated pellets for baby pigs.

EXAMPLE

The uncoated pellets introduced into the storage bin 5 may have a diameter of approximately ⅛ of an inch and range in length from ⅛ to ¾ inch and are formed from the following extrudable mixture.

| Ingredients | Parts by Weight |
| --- | --- |
| Corn Meal | 42 |
| Soybean Meal | 28 |
| Whey Prot. Conc. and Blood Plasma | 13 |
| Rolled Oats, An. Fat, Mineral Components, and Medication | 17 |

The binder in tank 10 is prepared by dissolving gelatin in warm tap water at 140–150 F. and then chilling to form a viscous liquid which can be circulated so as to remain fluid. The binder is metered into the coater 8 while uncoated pellets are being fed into the coater from the storage bin 5. The minimum dwell time in the coater 8 is that which is sufficient to allow the individual pellets to receive a coating of the binder and become damp at the surface before discharging into rotary drum 25.

The dry coating powder mixture is prepared by mixing dry ingredients to yield the following dusting mixture:

|  | Parts by Weight |
| --- | --- |
| Whey Protein Concentrate | 2 |
| Whey Permeate | 1 |

As the binder coated pellets move through the rotary dusting drum 32 the dusting mixture therein adheres tightly to the damp pellets and forms a smooth, continuous surface on each pellet. The adherence of the powder is aided by its hygroscopicity.

The inclusion of the curing step in the rotary drum 32 is considered to be the unique and important feature of the present invention.

Presently, the following are also considered important features of the production process. The use of whey powders as a coating utilizes the hygroscopic nature of this ingredient to "bond" it by way of the binder to the uncoated pellets. The use of an aqueous gel as the binder enables the process to keep added moisture to a minimum and prevent pellet deterioration. Whey protein concentrate acts as a carrier for the whey permeate and enables the product to be made under conditions of high humidity. The sequence of addition of binder to the uncoated pellets, and thereafter, powder to a dry chamber in a sequence process, enables the product to be made with a minimum of equipment clean-up. The use of a rotary disc type liquid applicator enables the binder to be added in a viscous form, which gives a high powder:pellet ratio and a low binder:pellet ratio. The overall process improves pellet durability, reduces the fines level and consequently reduces feed wastage.

What is claimed is:

1. In the method of making coated feed agglomerates which comprises,
    preparing extruded feed agglomerates on which it is desired to apply a coating containing at least one ingredient having a substantial lactose content and which is either not included in the agglomerates as extruded or not included therein at a desired inclusion rate level,
    coating said extruded agglomerates with a viscous gel binder leaving the gel coated agglomerates in a damp condition,
    applying a powder containing said at least one ingredient having a substantial lactose content to said gel-coated agglomerates while in their damp condition, and
    drying the gel binder and powder coated agglomerates,
    the improvement which comprises agitating a body of said gel binder and powder coated agglomerates for an appreciable time before drying, said appreciable time being sufficient to render the end product free flowing upon drying and for the powder coating to undergo a cure in which said lactose content undergoes a transition from the amorphous form to a crystalline structure that yields a nonhygroscopic product.

2. The method of claim 1, wherein said coated agglomerates are extruded animal feed pellets which are not by themselves ideally suitable for animal feeding purposes in that they lack certain required levels of ingredients that are not amenable to extrusion.

3. The method of claim 2, wherein said viscous gel binder is a viscous, aqueous solution of gelatin.

4. Pellets made in accordance with the method of claim 3.

5. Pellets made in accordance with the method of claim 2.

6. The method of claim 2, wherein said powder comprises whey permeate, whey protein concentrate and starch.

7. Pellets made in accordance with the method of claim 6.

8. The method of claim 2, wherein said powder contains a flavor enhancer.

9. Pellets made in accordance with the method of claim 8.

10. The method of claim 2, wherein said viscous gel is applied to said base pellets in a liquid coater wherein said viscous gel is fed onto a rotating disc and thereby sprayed centrifugally onto a curtain of base pellets formed within said coater.

11. Pellets made in accordance with the method of claim 10.

12. The method of claim 10, wherein after said gel-coated pellets are discharged from said liquid coater and before said powder is applied thereto they are agitated so as to obtain increased dispersion of the viscous gel on said gel-coated base pellets.

13. Pellets made in accordance with the method of claim 12.

14. The method of claim 2, wherein during said step of agitating a body of gel binder and powder coated pellets before said drying step, starch powder is metered onto the agitated body.

15. Pellets made in accordance with the method of claim 14.

16. The method of claim 2, wherein said damp gel-coated base pellets and said powder containing said ingredient having a substantial lactose content are introduced into the upper end of an inclined rotating drum and said pellets are discharged from the lower end thereof with a coating of said gel and powder.

17. Pellets made in accordance with the method of claim 16.

18. Agglomerates made in accordance with the method of claim 1.

* * * * *